United States Patent
Shivanna

(10) Patent No.: US 10,255,438 B2
(45) Date of Patent: Apr. 9, 2019

(54) OPERATING SYSTEM AGNOSTIC VALIDATION OF FIRMWARE IMAGES

(71) Applicant: Hewlett Packard Enterprise Development LP, Houston, TX (US)

(72) Inventor: Suhas Shivanna, Bangalore (IN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 185 days.

(21) Appl. No.: 15/325,758

(22) PCT Filed: Sep. 24, 2014

(86) PCT No.: PCT/US2014/057199
§ 371 (c)(1),
(2) Date: Jan. 12, 2017

(87) PCT Pub. No.: WO2016/048300
PCT Pub. Date: Mar. 31, 2016

(65) Prior Publication Data
US 2017/0154184 A1 Jun. 1, 2017

(51) Int. Cl.
*G06F 21/57* (2013.01)
*G06F 8/654* (2018.01)
(Continued)

(52) U.S. Cl.
CPC .............. *G06F 21/572* (2013.01); *G06F 8/63* (2013.01); *G06F 8/654* (2018.02); *G06F 9/44* (2013.01); *G06F 21/44* (2013.01); *G06F 21/57* (2013.01); *G06F 21/575* (2013.01); *G06F 21/64* (2013.01); *G06F 2221/034* (2013.01)

(58) Field of Classification Search
CPC ........ G06F 21/572; G06F 21/44; G06F 21/57; G06F 21/575; G06F 9/44; G06F 2221/034
See application file for complete search history.

(56) References Cited

U.S. PATENT DOCUMENTS 6,976,163 B1  12/2005  Hind
8,060,482 B2  11/2011  Wang et al.
(Continued)

OTHER PUBLICATIONS

"Device protection with KNOX Workspace," Retrieved from internet Aug. 19, 2014, 9 Pgs., https://www.samsungknox.com/en/solutions/knox/technical.
(Continued)

*Primary Examiner* — Robert B Leung
(74) *Attorney, Agent, or Firm* — Hewlett Packard Enterprise Patent Department

(57) ABSTRACT

Examples relate to providing operating system (OS) agnostic validation of firmware images. In some examples, a request to verify a number of firmware images is received, where each of the firmware images is associated with a metadata set. A first installation of a first firmware image of the firmware images is accessed via a physical interface, and a first metadata set is used to verify the first installation, where the first metadata set includes a firmware signature that is used to verify the first installation. At this stage, the request is forwarded to a child management processor, where the management processors are in a trusted group and related according to a tree hierarchy.

12 Claims, 4 Drawing Sheets

(51) Int. Cl.
  *G06F 21/64* (2013.01)
  *G06F 9/44* (2018.01)
  *G06F 8/61* (2018.01)
  *G06F 21/44* (2013.01)

(56) References Cited

U.S. PATENT DOCUMENTS

| | | | |
|---|---|---|---|
| 2003/0191955 A1* | 10/2003 | Wagner | G06F 21/572 |
| | | | 713/191 |
| 2004/0230963 A1* | 11/2004 | Rothman | G06F 8/65 |
| | | | 717/168 |
| 2008/0052698 A1* | 2/2008 | Olson | G06F 9/44589 |
| | | | 717/168 |
| 2008/0077993 A1* | 3/2008 | Zimmer | G06F 9/5077 |
| | | | 726/27 |
| 2009/0013406 A1 | 1/2009 | Cabuk | |
| 2010/0082955 A1 | 4/2010 | Chhabra | |
| 2012/0151358 A1 | 6/2012 | Joanny et al. | |
| 2012/0255012 A1 | 10/2012 | Sallam | |
| 2012/0266170 A1 | 10/2012 | Zimmerman et al. | |
| 2013/0212406 A1 | 8/2013 | Datta | |
| 2014/0006760 A1 | 1/2014 | Nemiroff et al. | |

OTHER PUBLICATIONS

International Searching Authority, The International Search Report and the Written Opinion, PCT/US2014/057199, Jun. 24, 2015, 9 Pgs.

\* cited by examiner

OPERATING SYSTEM AGNOSTIC VALIDATION OF FIRMWARE IMAGES

BACKGROUND

With increased risk of cyber-attacks and increased focus on compliance, security is becoming a key differentiator for infrastructure products such as servers, storage and networking. Compromised firmware can have a big impact on the security of information systems. Typically, both signed and unsigned firmware images are installed on a server and, in some cases, the signature after validation is stripped before flashing the image. Operating system (OS) utilities can be used to validate a basic input/output system (BIOS) image at run time, and the secure boot unified extensible firmware interface (UEFI) supports validating UEFI apps/drivers and boot loaders at boot time.

BRIEF DESCRIPTION OF THE DRAWINGS

The following detailed description references the drawings, wherein.

DETAILED DESCRIPTION

As detailed above, with increased risk of cyber-attacks targeted at Firmware, there is a need for a comprehensive on-demand OS agnostic solutions for validating firmware images that covers the entire gamut of firmware images, which include subsystems, BIOS, and input/output (IO) cards.

Examples disclosed herein provide an OS agnostic technique for validating the integrity of firmware images in a single node or multi-node server design. In these examples, the integrity of firmware images are validated on-demand (i.e., during boot or run-time and for images with and without signatures) by using a trusted group of management processors in a server chassis and a firmware validation service hosted by each management processor. Run-time authentication by an IO Controller allows for the detection of hacked IO firmware images without loading the complete firmware image.

In this manner, examples disclosed herein provide OS agnostic validation of firmware images. In some examples, a request to verify a number of firmware images is received, where each of the firmware images is associated with a metadata set. A first installation of a first firmware image of the firmware images is accessed via a physical interface that connects to a flash or other appropriate device, and a first metadata set is used to verify the first installation, where the first metadata set includes a firmware signature that is used to verify the first installation. At this stage, the request is forwarded to a child management processor, where the management processors are in a trusted group and related according to a tree hierarchy.

Figure 1:
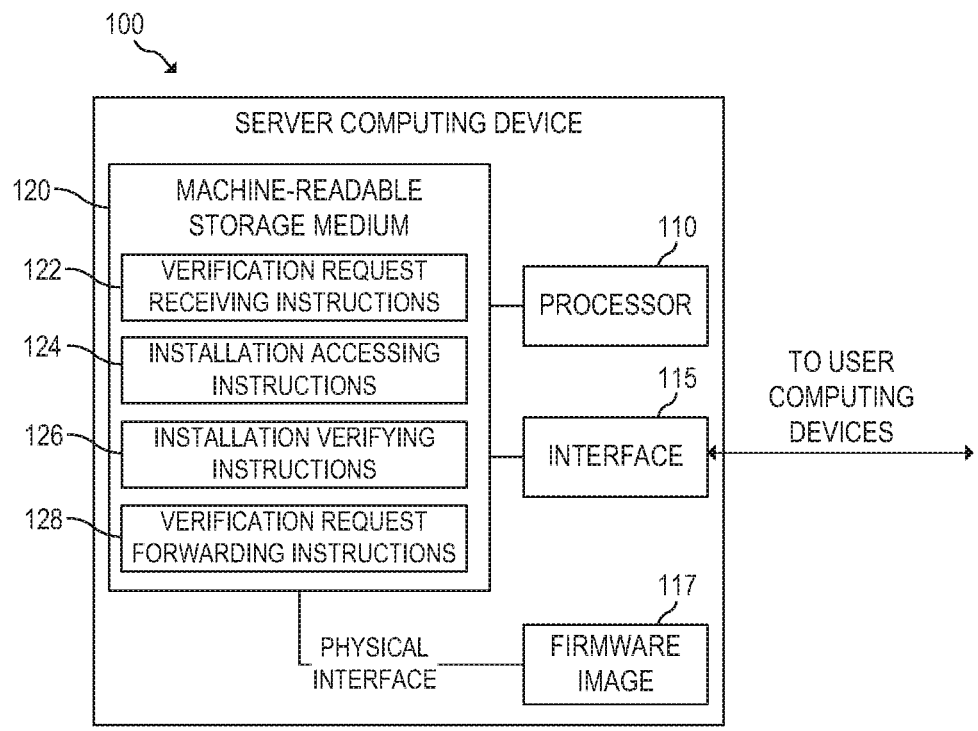
FIG. 1 is a block diagram of an example server computing device for providing OS agnostic validation of firmware images.

Referring now to the drawings, FIG. 1 is a block diagram of an example server computing device 100 for providing OS agnostic validation of firmware images. Server computing device 100 may be any computing device such as a server (e.g., blade enclosure with many blade servers, a blade server in a blade enclosure, stand-alone server in a rack with multiple nodes with each node acting like a server, etc.), a desktop computer, etc. In the embodiment of FIG. 1, server computing device 100 includes a management processor 110, an interface 115, a firmware image 117, and a machine-readable storage medium 120.

Processor 110 may be one or more central processing units (CPUs), microprocessors, and/or other hardware devices suitable for retrieval and execution of instructions stored in machine-readable storage medium 120. Processor 110 may fetch, decode, and execute instructions 122, 124, 126, 128 to enable providing OS agnostic validation of firmware images 117, as described below. As an alternative or in addition to retrieving and executing instructions, processor 110 may include one or more electronic circuits comprising a number of electronic components for performing the functionality of one or more of instructions 122, 124, 126, 128.

Interface 115 may include a number of electronic components for communicating with computing devices. For example, interface 115 may be an Ethernet interface, a Universal Serial Bus (USB) interface, an IEEE 1394 (FireWire) interface, an external Serial Advanced Technology Attachment (eSATA) interface, or any other physical connection interface suitable for communication with computing devices. Alternatively, interface 115 may be a wireless interface, such as a wireless local area network (WLAN) interface or a near-field communication (NFC) interface. In operation, as detailed below, interface 115 may be used to send and receive data to and from corresponding interfaces of computing devices.

Firmware image 117 is installed on persistent memory and is configured to manage a component (e.g., IO controller, BIOS, subsystem component, etc.) of server computing device 100. A firmware signature can be used to validate the firmware image 117 during an initial installation and as described below to validate an installed image.

Machine-readable storage medium 120 may be any electronic, magnetic, optical, or other physical storage device that stores executable instructions. Thus, machine-readable storage medium 120 may be, for example, Random Access Memory (RAM), Read-Only Memory (ROM), Electrically-Erasable Programmable Read-Only Memory (EEPROM), flash memory, a storage drive, an optical disc, and the like. As described in detail below, machine-readable storage medium 120 may be encoded with executable instructions for providing OS agnostic validation of firmware images 117.

Verification request receiving instructions 122 receives a request to verify firmware of server computing device 100. Server computing device 100 can include numerous firmware installations for a variety of components such as IO controllers, manageability subsystems, processors, etc. The verification request may request that the firmware of each component be verified. In some cases, the firmware request may also specify the type of verification (e.g., fast or full validation as described below) to be performed on the firmware. The verification request can be received at a root management processor of server computing device 100, where the root management processor is a member of a trusted group that includes a number of management processors. Members of the trusted group have privileged access to each other and to components of server computing device 100.

Installation accessing instructions 124 accesses a firmware image 117 of server computing device 100 via a physical interface. For example, the physical interface may be a sideband interface based on common standards such as serial peripheral interface (SPI), inter-integrated circuit (I2C), or peripheral component interconnect express (PCIe) that provides access to an IO controller. In this example, the sideband interface can provide an application programming interface (API) that allows for a firmware installation associated with the IO controller to be accessed using commands sent over the sideband interface. In some cases, metadata (e.g., version, signature, compile date, etc.) associated with the firmware installation is accessed. In other cases, the entire firmware image 117 can be accessed.

Installation verifying instructions 126 verifies that the firmware installation is valid. If the entire firmware image has been obtained, the entire firmware image can be used to calculate an image signature, which can then be compared to a valid/approved set of image signatures to perform a full verification of the validity of the installation. In other cases, the firmware signature or other metadata may be embedded in the firmware installation. For example, addresses of the firmware installation can be designated for various metadata inside the firmware image 117, which can be extracted by installation verifying instructions 126 to verify the firmware installation. The extracted metadata can be compared to stored metadata to perform a fast verification of the validity of the installation.

Figure 5:
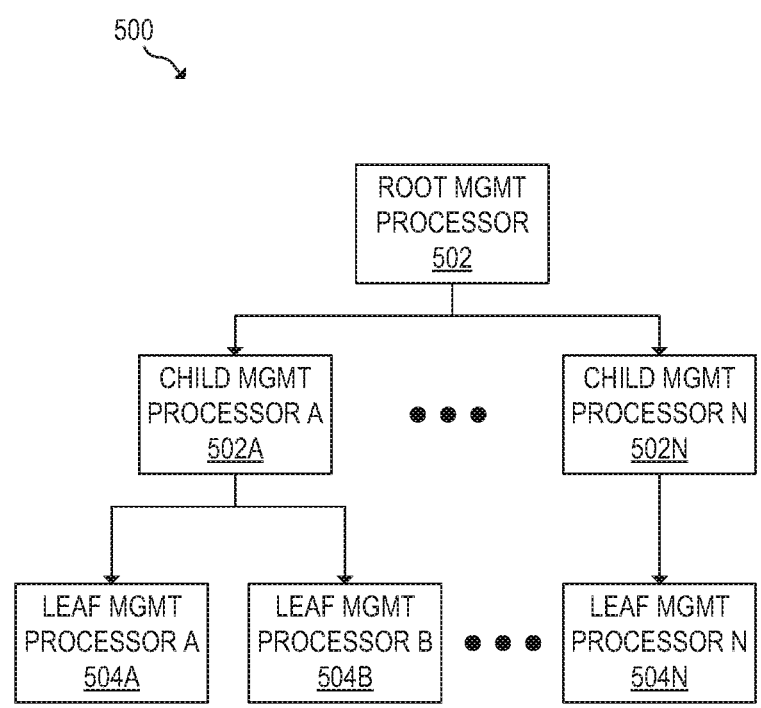
FIG. 5 is a block diagram of an example tree hierarchy of management processors for validating firmware images in a tree hierarchy.

Verification request forwarding instructions 128 forwards the verification request to child management processors. The management processors in the trusted group are related according to a tree hierarchy as shown in FIG. 5, where the root management processor is the root node of the tree hierarchy. Each of the management processor can be associated with different firmware images 117 of server computing device 100. When the verification request is forwarded to the child management processors, each of the child management processors processes the request similar to as described above for the root management processor. In this manner, the verification request traverses the tree hierarchy so that the validity of each firmware installation is determined.

Figure 2:
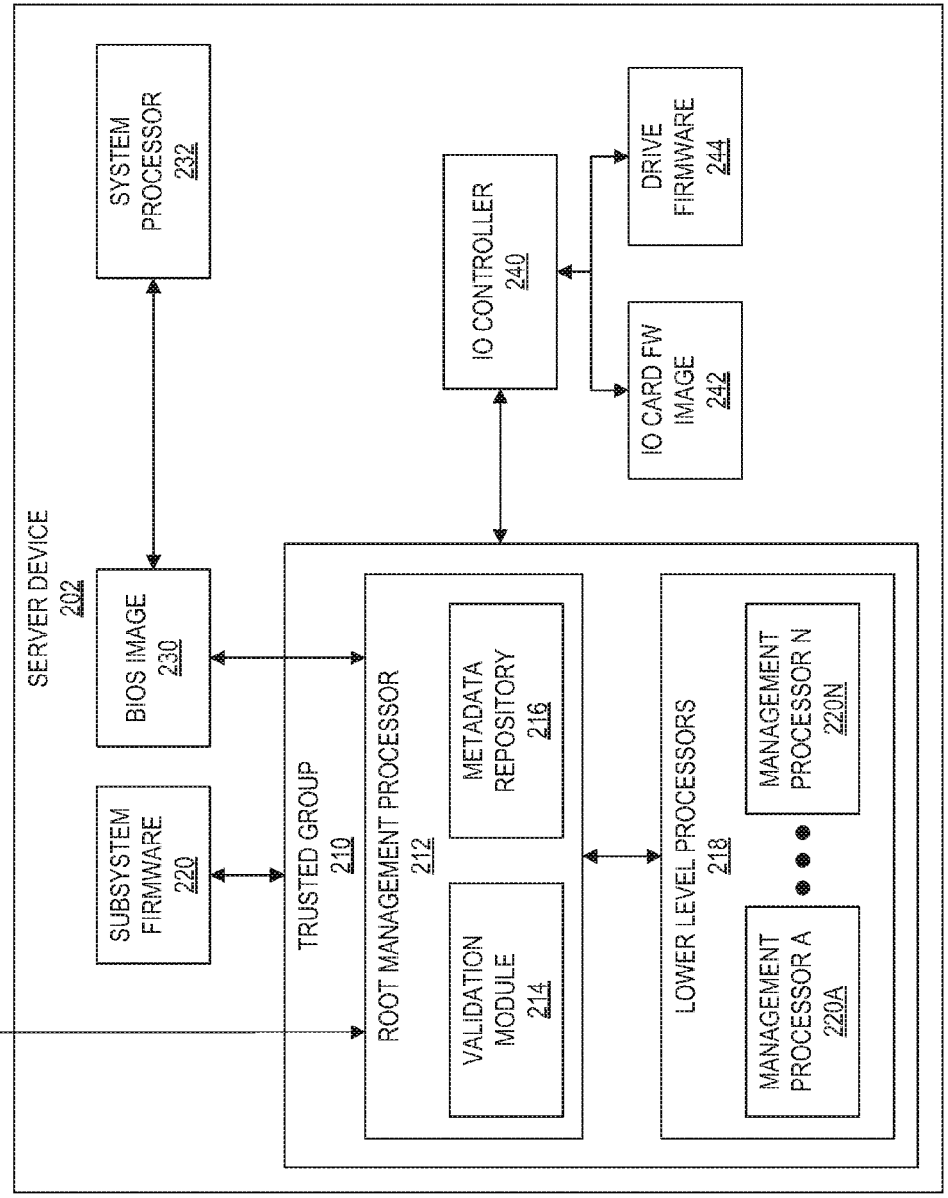
FIG. 2 is a block diagram of an example server device in communication with a management station for providing OS agnostic validation of firmware images.

FIG. 2 is a block diagram of an example system 200 with server device 202 in communication with management station 204 for providing OS agnostic validation of firmware images. As illustrated in FIG. 2 and described below, server device 202 may communicate with management station 204 to allow a user to conveniently manage server device 202.

As with server computing device 100 of FIG. 1, server device 202 may be any server accessible to management station 204 over a network (e.g., Internet, Intranet, local network, etc.) that is suitable for executing the functionality described below. As detailed below, server device 202 may include a series of components 202-234 for providing OS agnostic validation of firmware images.

Server device 202 includes trusted group 210 of management processors (e.g., root management processor 212, lower level processors 218, etc.) that are configured to verify the validity of firmware installations (e.g., subsystem firmware 220, BIOS image 230, IO card firmware image 242, drive firmware 244, etc.). As described above with respect to FIG. 1. The management processors (e.g., root management processor 212, lower level processors 218, etc.) can be arranged in a tree hierarchy. Further, as members of trusted group 210, communications between the management processors is facilitated and secure. Each of the management processors (e.g., root management processor 212, lower level processors 218, etc.) may be assigned to verify the validity of different firmware (e.g., subsystem firmware 220, BIOS image 230, IO card firmware image 242, drive firmware 244, etc.).

Root management module 212 monitors the integrity of an associated firmware installation. Validation module 214 processes validation requests received from management station 204. A validation request can request that all or a subset of the firmware installations of server device 202 be validated. The validation request may also specify the type of validation that should be performed (e.g., fast validation or full validation). Validation module 214 initiates validation of the associated firmware installations in response to the validation request. For example, validation module 214 can access IO controller 240 and related firmware (e.g., IO card firmware image 242, drive firmware 244, etc.) via a sideband interface. In another example, root management processor 212 can access related firmware directly (e.g., subsystem firmware 220, BIOS image 230, etc.). For devices that are accessible using IO controller 240, the firmware image may retrieved and validated after authentication in a secure manner using commands that are sent over the sideband interface.

In the fast mode for verifying firmware images, validation module 214 reads the digital signature from directly accessible images and compares with the signature stored in metadata repository 216. For images that are accessible via the sideband interface, the validation module 214 sends an encrypted signature using the last loaded image using keys stored in metadata repository 216 and expects the same signature to be returned from IO controller 240, IO controller 240 decodes the command request using a corresponding private key, decrypts the message, and responds with the signature, which gets verified by validation module 214. The fast mode verifies the integrity/sanity of all firmware images but is not capable of detecting malwares that modify a portion of the firmware image. This run-time authentication of IO controller 240 is capable of detecting different types of hacked firmware image due to certain attacks without loading the complete firmware image.

In the full mode for verifying firmware images, the validation module 214 does an exhaustive check of the integrity of the firmware image by reading and verifying the complete firmware image. For images that are accessible via the sideband interface, the validation module 214 issues commands to read the complete IO firmware image (e.g., IO card firmware image 242, drive firmware 244, etc.) and associated devices such as hard drives after authenticating IO controller 240. For a multi-node server design, the root management processor 212 sends commands for validating firmware images to all the management processor in the trusted group. Each management processor is responsible for validating the firmware images associated with it, and the aggregated results can be used to update the overall security health of the firmware image.

Metadata repository 216 stores metadata related to the firmware (e.g., subsystem firmware 220, BIOS image 230, IO card firmware image 242, drive firmware 244, etc.). Metadata repository 216 may be secured with a digital signature and flashed when server device 202 is manufactured in a write protected region in the server memory (e.g., non-volatile random-access memory (NVRAM), etc.).

Examples of firmware metadata include, but are not limited to, valid firmware image signatures, version numbers, keys for verifying image signatures, image size, compile/build dates, etc. The firmware metadata is used by validation module 214 to verify firmware installations. For example, validation module 214 may use a key to verify a digital signature of a firmware image installed in subsystem firmware 220 (i.e., verify that the firmware image is the originally installed or updated image). If the image signature does not match a signature generated using the key, subsystem firmware 220 may have been hacked with an invalid image.

Validation module 214 can be configured to execute during boot or run-time. Further, validation module 214 is configured to forward the validation request to child management processors (e.g., management processor A 220A, management processor N 220N). In this manner, the validation request can traverse through the management processors (e.g., root management processor 212, lower level processors 218, etc.) according to a tree hierarchy, where each processor processes the validation request as described above for its respective firmware image. Root management processor 212 is configured to aggregate results from lower level processors 218 and provide the overall security health of firmware images along with the results to management station 204.

For blade and multi-node systems, management processors (e.g., root management processor 212, lower level processors 218, etc.) may be installed inside a chassis connected via a physical interface and automatically assigned to trusted group 210, allowing exchange of commands/messages for validating firmware images seamlessly within trusted group 210. Based on the server architecture, one management processor will be designated as a master to service requests from administrators.

Validation module 214 can also be configured by the management statement 204 to periodically retrieve digital signatures of all recently released firmware images over the Internet in a secure manner. The retrieved digital signatures and other firmware image metadata are added as an extension to the base metadata repository 216 in memory.

Figure 3:
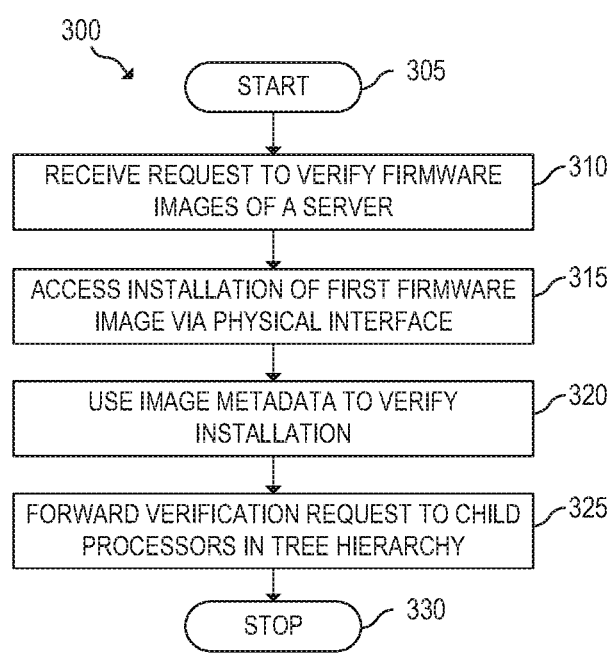
FIG. 3 is a flowchart of an example method for execution by a server computing device for providing OS agnostic validation of firmware images.

FIG. 3 is a flowchart of an example method 300 for execution by server computing device 100 for providing OS agnostic validation of firmware images. Although execution of method 300 is described below with reference to server computing device 100 of FIG. 1, other suitable devices for execution of method 300 may be used, such as server device 202 of FIG. 2. Method 300 may be implemented in the form of executable instructions stored on a machine-readable storage medium, such as storage medium 120, and/or in the form of electronic circuitry.

Method 300 may start in block 305 and continue to block 310, where server computing device 100 receives a request to verify firmware of server computing device 100. The verification request may instruct server computing device 100 to perform a full verification of all firmware for a variety of components such as IO controllers, subsystems, processors, etc. In block 315, server computing device 100 accesses a firmware installation via a physical interface (e.g., sideband interface).

In block 320, server computing device 100 verifies that the firmware installation is valid. In this example, the entire firmware image is obtained and then used to generate an image signature, which can then be compared to a stored key in an image repository. In block 325, server computing device 100 forwards the verification request to child management processors, which in turn verify their respective firmware installations as described above. In this manner, the verification request traverses the tree hierarchy so that the validity of each firmware installation is determined. Method 300 may then continue to block 330, where method 300 may stop.

Figure 4:
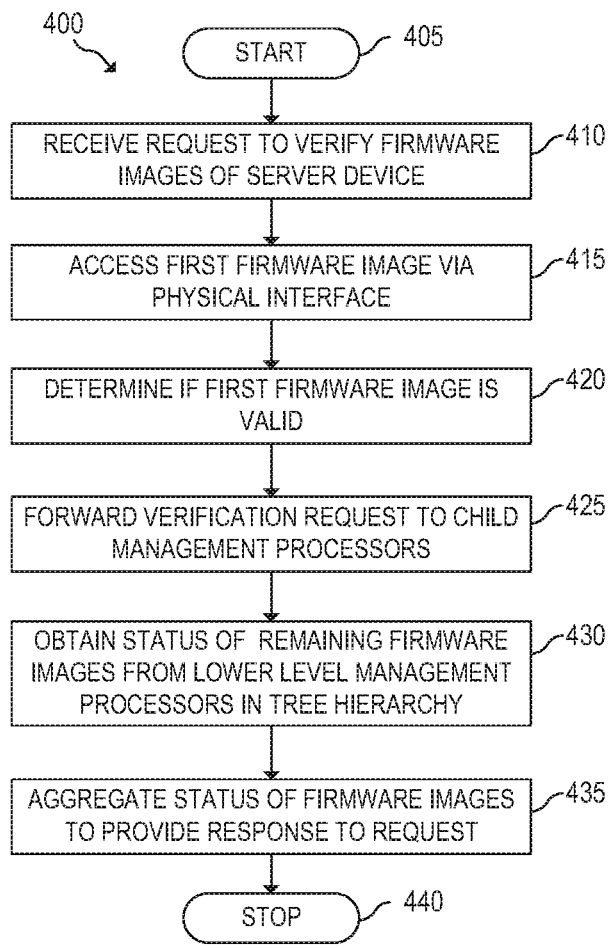
FIG. 4 is a flowchart of an example method for execution by a server device for providing OS agnostic validation of firmware images in a tree hierarchy.

FIG. 4 is a flowchart of an example method 400 for execution by a server device 202 for providing OS agnostic validation of firmware images in a tree hierarchy. Although execution of method 400 is described below with reference to server device 202 of FIG. 2, other suitable devices for execution of method 400 may be used, such as server computing device 100 of FIG. 1. Method 400 may be implemented in the form of executable instructions stored on a machine-readable storage medium and/or in the form of electronic circuitry.

Method 400 may start in block 405 and proceed to block 410, where server device 202 receives a request to verify firmware of server device 202. The verification request may instruct server device 202 to perform a fast check of a subset of firmware installations or a full verification of all firmware installed on server device 202. In block 415, server device 202 accesses a firmware installation via a direct connection of physical interface (e.g., sideband interface).

In block 420, server device 202 verifies that the first firmware installation is valid. For example, subsystem firmware can be accessed directly and then verified using firmware metadata. In block 425, server device 202 forwards the verification request to child management processors, which in turn verify their respective firmware installations. In block 430, server device 202 obtains the verification status of the remaining firmware installations from the child management processors, where the child management processors have in turn obtained verification status from grandchild management processors and so on. In block 435, the verification status of the firmware installations is aggregated and provided in response to the initial request received in block 410. Method 400 may then continue to block 440, where method 400 may stop.

FIG. 5 is a block diagram of an example tree hierarchy 500 of management processors for validating firmware images in a tree hierarchy. Tree hierarchy 500 includes root management processor 502, child management processors 502A-502N, and leaf management processors 504A-504N. While only three levels of management processors are shown in tree hierarchy 500, any number of levels could be included.

Root management processor 502 handles verification requests to verify the firmware of an associated server device. Root management processor 502 can then verify firmware assigned to the root management processor 502 and then propagate the verification request throughout the tree hierarchy 500 by forwarding the request to child management processors 502A-502N. The verification request is then recursively propagated throughout tree hierarchy 500 until the request reaches leaf management processors 504A-504N, which verify their assigned firmware installations and return the result back up the tree hierarchy 500. Root management processor 502 can then aggregate the results from all the management processors and return the aggregated results to the requesting entity.

The foregoing disclosure describes a number of example embodiments for providing OS agnostic validation of firmware images installed on a server device. In this manner, the embodiments disclosed herein enable OS agnostic validation by using management processors in a trusted group and arranged in a tree hierarchy.

I claim:

1. A system for providing operating system (OS) agnostic validation of firmware images, the system comprising:
   a storage device to store a plurality of metadata sets that are each associated with one of a plurality of firmware images; and
   a management processor of a plurality of management processors that is operatively connected to the storage device, wherein the plurality of management processors are assigned to a trusted group, the management processor to:
      receive a request to verify the plurality of firmware images;
      access a first installation of a first firmware image of the plurality of firmware images via a physical interface;
      use a first metadata set of the plurality of metadata sets to verify the first installation;
      forward the request to a child management processor of the plurality of management processors, wherein the plurality of management processors are related according to a tree hierarchy;
      use a second metadata set of the plurality of metadata sets to verify a second installation of a second firmware image of the plurality of firmware images
      aggregate verification results from the plurality of management processors; and
      generate a firmware status response based on the verification results.

2. The system of claim 1, wherein the child management processor is to:
   forward the request to a grandchild management processor of the plurality of management processors.

3. The system of claim 1, wherein the physical interface is an authenticated sideband interface, and wherein the firmware installation is installed on an input/output (I/O) controller.

4. The system of claim 1, wherein the first metadata set comprises a firmware signature that is used to verify the first installation.

5. The system of claim 1, wherein the first metadata set comprises a version number and compilation date of the first firmware image that are used to verify the first installation.

6. A method for providing operating system (OS) agnostic validation of firmware images, the method comprising:
   receiving a request to verify a plurality of firmware images, wherein each of the plurality of firmware images is associated with one of a plurality of metadata sets;
   accessing a first installation of a first firmware image of the plurality of firmware images via a physical interface;
   using a first metadata set of the plurality of metadata sets to verify the first installation, wherein the first metadata set comprises a firmware signature that is used to verify the first installation;
   forwarding the request to a child management processor of a plurality of management processors, wherein the plurality of management processors are in a trusted group and related according to a tree hierarchy;
   using a second metadata set of the plurality of metadata sets to verify a second installation of a second firmware image of the plurality of firmware images;
   aggregating verification results from the plurality of management processors; and
   generating a firmware status response based on the verification results.

7. The method of claim 6, further comprising:
   forwarding the request to a grandchild management processor of the plurality of management processors.

8. The method of claim 6, wherein the physical interface is an authenticated sideband interface, and wherein the firmware installation is installed on an input/output (I/O) controller.

9. The method of claim 6, wherein the first metadata set comprises a version number and compilation date of the first firmware image that are used to verify the first installation.

10. A non-transitory machine-readable storage medium encoded with instructions executable by a processor for providing operating system (OS) agnostic validation of firmware images, the machine-readable storage medium comprising instruction to:
    receive a request to verify a plurality of firmware images, wherein each of the plurality of firmware images is associated with one of a plurality of metadata sets;
    access a first installation of a first firmware image of the plurality of firmware images via a physical interface;
    use a first metadata set of the plurality of metadata sets to verify the first installation, wherein the first metadata set comprises a firmware signature that is used to verify the first installation;
    forward the request to a child management processor of a plurality of management processors, wherein the plurality of management processors are in a trusted group and related according to a tree hierarchy;
    use a second metadata set of the plurality of metadata sets to verify a second installation of a second firmware image of the plurality of firmware images;
    aggregate verification results from the plurality of management processors, wherein each of the verification results describes that validity of one of the plurality of firmware images; and
    generate a firmware status response based on the verification results.

11. The non-transitory machine-readable storage medium of claim 10, wherein the machine-readable storage medium further comprises instruction to:
    forward the request to a grandchild management processor of the plurality of management processors.

12. The non-transitory machine-readable storage medium of claim 10, wherein the physical interface is an authenticated sideband interface, and wherein the firmware installation is installed on an input/output (I/O) controller.

* * * * *